(12) United States Patent
Lee et al.

(10) Patent No.: US 11,830,176 B2
(45) Date of Patent: Nov. 28, 2023

(54) METHOD OF MEASURING A SEMICONDUCTOR DEVICE

(71) Applicant: NANYA TECHNOLOGY CORPORATION, New Taipei (TW)

(72) Inventors: Kai Lee, New Taipei (TW); Hao-Hsiang Huang, New Taipei (TW); Chih-Chien Huang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 166 days.

(21) Appl. No.: 17/447,440

(22) Filed: Sep. 12, 2021

(65) Prior Publication Data
US 2023/0081300 A1    Mar. 16, 2023

(51) Int. Cl.
G06T 7/00    (2017.01)
G06T 7/70    (2017.01)
G06T 5/50    (2006.01)
G06T 5/00    (2006.01)

(52) U.S. Cl.
CPC ............ *G06T 7/0006* (2013.01); *G06T 5/008* (2013.01); *G06T 5/50* (2013.01); *G06T 7/70* (2017.01); *G06T 2207/10061* (2013.01); *G06T 2207/20224* (2013.01); *G06T 2207/30148* (2013.01)

(58) Field of Classification Search
CPC ......... G06T 7/0006; G06T 5/008; G06T 5/50; G06T 7/70; G06T 2207/10061; G06T 2207/20224; G06T 2207/30148
USPC ...................................................... 382/145
See application file for complete search history.

(56) References Cited

U.S. PATENT DOCUMENTS

| 5,535,289 A * | 7/1996 | Ito .................. H04N 5/3205 348/E5.089 |
| 7,440,105 B2 * | 10/2008 | Adel .................. H01L 22/12 257/797 |
| 11,216,932 B1 * | 1/2022 | Checka ................ G06N 3/08 |
| 2006/0110069 A1 * | 5/2006 | Tong .................. G06T 7/0004 382/293 |
| 2008/0095407 A1 * | 4/2008 | Stewart ................ G06T 7/33 382/284 |
| 2011/0155904 A1 * | 6/2011 | Hotta .................. G06T 7/60 250/311 |
| 2014/0254916 A1 * | 9/2014 | Lee .................. H04N 23/11 382/145 |

(Continued)

FOREIGN PATENT DOCUMENTS

EP    2749208 A1 *    7/2014    .......... A61B 5/0035

*Primary Examiner* — Matthew C Bella
*Assistant Examiner* — Pardis Sohraby
(74) *Attorney, Agent, or Firm* — CKC & Partners Co., LLC (57) ABSTRACT

The present disclosure provides a method of measuring a semiconductor device, including the following operations: obtaining a first image corresponding to a first layer in the semiconductor device; obtaining a second image corresponding to a second layer, below the first layer, in the semiconductor device, wherein the first layer includes at least one first structure and the second layer includes a plurality of second structures that are overlapped by the at least one first structure; generating a third image by combining the first image and the second image; and calculating an offset between the at least one first structure and the plurality of second structures based on the first image and the third image.

20 Claims, 6 Drawing Sheets

(56) References Cited

U.S. PATENT DOCUMENTS

| | | | | |
|---|---|---|---|---|
| 2014/0270475 A1* | 9/2014 | Huang | ............... | G06T 7/001 |
| | | | | 382/149 |
| 2016/0013109 A1* | 1/2016 | Yun | ............... | H01J 37/222 |
| | | | | 250/307 |
| 2016/0141213 A1* | 5/2016 | Bishop | ............... | H01L 24/11 |
| | | | | 438/16 |
| 2021/0350507 A1* | 11/2021 | Fang | ............... | G06T 5/20 |
| 2021/0382401 A1* | 12/2021 | Liu | ............... | G03F 7/70683 |
| 2022/0108436 A1* | 4/2022 | Kang | ............... | G06T 7/0008 |

* cited by examiner

METHOD OF MEASURING A SEMICONDUCTOR DEVICE

BACKGROUND

Description of Related Art

In semiconductor industry, the scanning electron microscope is utilized to measure structures of semiconductor devices in a fine scale through the transmission of electrons. However, the electrons are not capable to transmit certain materials, so that the image of some surfaces lower than the front surface of the semiconductor device appears blurred or are not qualified for further analysis of properties of the semiconductor device.

SUMMARY

One aspect of the present disclosure is to provide a method of measuring a semiconductor device, including the following operations: obtaining a first image corresponding to a first layer in the semiconductor device; obtaining a second image corresponding to a second layer, below the first layer, in the semiconductor device, wherein the first layer includes at least one first structure and the second layer includes a plurality of second structures that are overlapped by the at least one first structure; generating a third image by combining the first image and the second image; and calculating an offset between the at least one first structure and the plurality of second structures based on the first image and the third image.

Another aspect of the present disclosure is to provide a method of measuring a semiconductor device, including the following operations: adjusting a first image of a plurality of first holes in a first layer of the semiconductor device and adjusting a second image of a plurality of second holes in a second layer, different from the first layer, of the semiconductor device; generating, based on the first image of the plurality of first holes and the second image of the plurality of second holes, a third image according to identifying the plurality of second holes in the third image; and calculating a first offset between a first hole of the plurality of first holes and a first group of the plurality of second holes, wherein the first hole of the plurality of first holes overlap the first group of the plurality of second holes.

Another aspect of the present disclosure is to provide a method of measuring a semiconductor device, including the following operations: generating a mixed image based on a first scanning electron microscope (SEM) image corresponding to a first layer in the semiconductor device and a second SEM image corresponding to a second layer, different from the first layer, in the semiconductor device; identifying a plurality of first holes in the first image and identifying a plurality of second holes in the mixed image, wherein each of the plurality of first holes overlaps a corresponding group of holes in the plurality of second holes; calculating sub-offsets between a center of each one of the plurality of first holes and a center of each one in the corresponding group of holes in the plurality of second holes; and calculating an offset between the plurality of first holes and the plurality of second holes based on the sub-offsets.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The spirit of the present disclosure will be discussed in the following drawings and detailed description, and those of ordinary skill in the art will be able to change and modify the teachings of the present disclosure without departing from the spirit and scope of the present disclosure.

It should be understood that, in this document and the following claims, when an element is referred to as being "connected" or "coupled" to another element, it can be directly connected or coupled to another element, or there may be an intervening component. In contrast, when an element is referred to as being "directly connected" or "directly coupled" to another element, there is no intervening element. In addition, "electrically connected" or "connected" may also be used to indicate that two or more elements cooperate or interact with each other.

It should be understood that, in this document and the following claims, the terms "first" and "second" are to describe the various elements. However, these elements should not be limited by these terms. These terms are used to distinguish one element from another. For example, a first element may be termed a second element. Similarly, a second element may be termed a first element without departing from the spirit and scope of the embodiments.

It should be understood that, in this document and the following claims, the terms "include," "comprise," "having" and "has/have" are used in an open-ended fashion, and thus should be interpreted to mean "include, but not limited to."

It should be understood that, in this document and the following claims, the term "and/or" includes any and all combinations of one or more of the associated listed items.

It should be understood that, in this document and the following claims, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
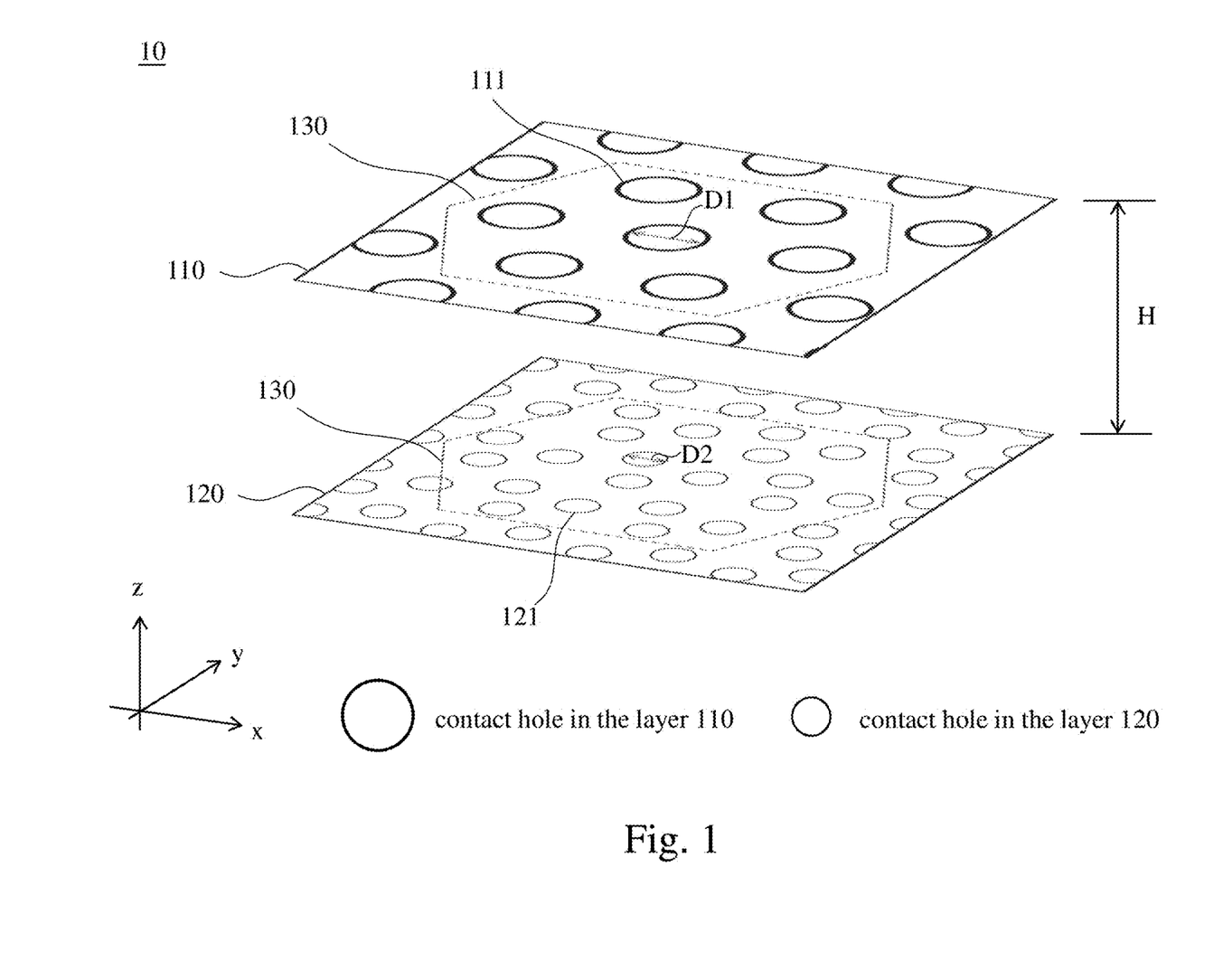
FIG. 1 is a schematic diagram of a semiconductor device, in accordance with some embodiments of the present disclosure.

Reference is now made to FIG. 1. FIG. 1 is a schematic diagram of a semiconductor device 10, in accordance with some embodiments of the present disclosure. For illustration, the semiconductor device 10 includes a layer 110 and a layer 120 different from the layer 110. In some embodiments, the layer 110 is disposed above the layer 120 by a distance H on along the z direction on a front side of the semiconductor device 10. In some embodiments, the distance H is greater than 1 micrometer. Alternatively stated, in a front side view, the layer 110 overlaps the layer 120.

As shown in FIG. 1, the layer 110 includes multiple structures, for example, contact holes 111, and each of the contact holes 111 has a diameter D1. The layer 120 includes multiple structures, for example, contact holes 121, and each of the contact holes 121 has a diameter D2. In some embodiments, the diameter D1 is greater than the diameter D2. Alternatively stated, each of the contact holes 111 occupies a greater area than each of the contact holes 121.

The configurations of FIG. 1 are given for illustrative purposes. Various implements are within the contemplated scope of the present disclosure. For example, in some embodiments, the structures in the layers 110-120 are other semiconductor structures rather than holes shown in FIG. 1. For instance, the structures in the layers 110-120 are contactor between the layers 110-120.

In some embodiments, the semiconductor device 10 is tested or measured during manufacturing processes in which a high voltage scanning electron microscope (SEM) is utilized to obtain detailed structures of the semiconductor device 10. Accordingly, obtained SEM images are analyzed for further purposes including, for example, yield improvement.

Figure 2:
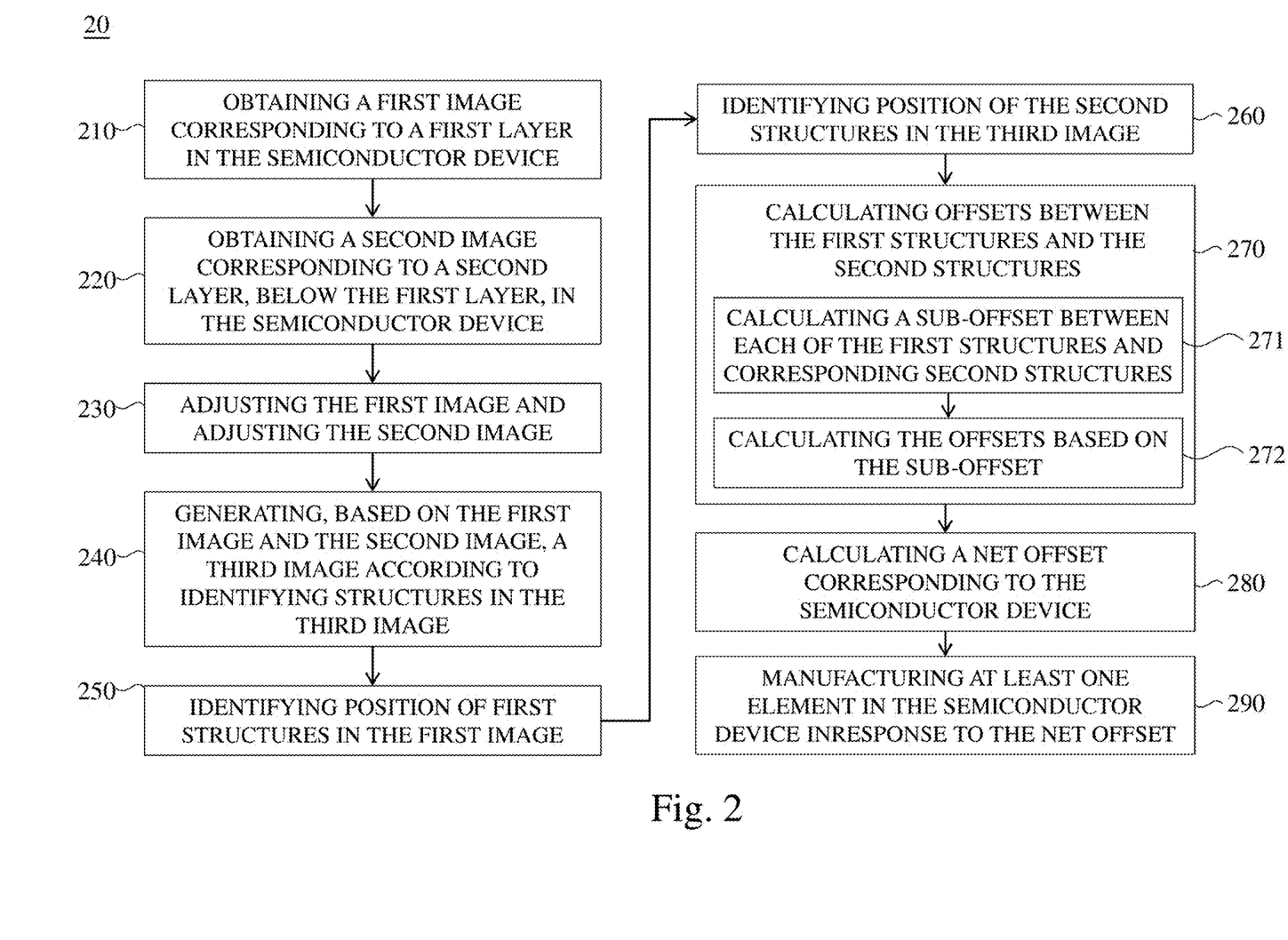
FIG. 2 is a flowchart of a method, in accordance with some embodiments of the present disclosure.

Reference is now made to FIG. 2. FIG. 2 is a flowchart of a method 20, in accordance with some embodiments of the present disclosure. It is understood that additional operations can be provided before, during, and after the processes shown by FIG. 2, and some of the operations described below can be replaced or eliminated, for additional embodiments of the method 20. The method 20 includes operations 210-290 that are described below with reference to FIGS. 3-5.

Figure 3:
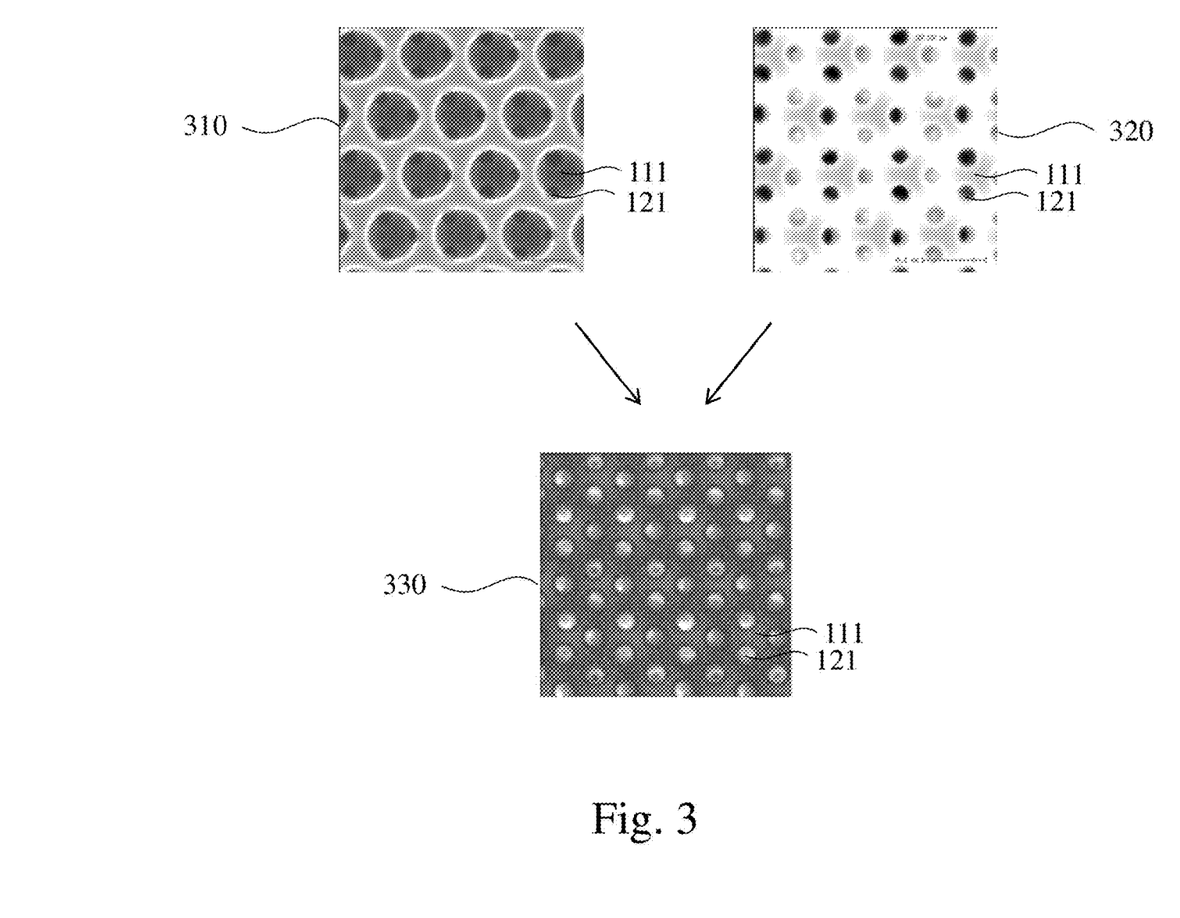
FIG. 3 includes scanning electron microscope (SEM) images corresponding to layers in the semiconductor device of FIG. 1, in accordance with some embodiments of the present disclosure.

Reference is now made to FIG. 3. FIG. 3 includes scanning electron microscope (SEM) images 310-330 corresponding to layers 110-120 in the semiconductor device 10 of FIG. 1, in accordance with some embodiments of the present disclosure. In operation 210, the image 310 corresponding to the layer 110 in the semiconductor device is obtained. As shown in the image 310 of FIG. 3, the contact holes 111 are arranged in arrays and each of the contact holes 111 overlaps a group of the contact holes 121 including three contact holes. In some embodiments, holes in the group of the contact holes 121 are concyclic points and lie on a common circle that has a center located at the center of the corresponding contact hole 111. Furthermore, the image 310 is taken when the focal plane of the SEM lies on the layer 110, accordingly, structures in the layer 120 appears blurred.

In operation 220, the image 320 corresponding to the layer 120 in the semiconductor device is obtained. As shown in the image 320 of FIG. 3, the contact holes 121 appear relatively clear, compared with those in the image 310. In some embodiments, the image 310 is taken when the focal plane of the SEM lies on the layer 120.

In operation 230, the images 310 and 320 are adjusted. For example, the adjustment to the images 310 and 320 includes adjusting properties of the image 310 and properties of the image 320. For example, an opacity of the image 310 and an opacity of the image 320 are adjusted to X % and Y % respectively, in which X and Y are numbers between about 0-100. In some embodiments, the properties of the images 310-320 includes, but are not limited to, for example, brightness, contrast, color temperature, saturation, sharpness, focus, color tint, or any other suitable properties.

In operation 240, the image 330 as a mixed image is generated based on the images 310 and 320 according to identifying structures in the image 330. In some embodiments, the images 310 and 320 are combined after being adjusted. Specifically, with reference to operations 230 and 240 together, the images 310 and 320 are adjusted according to an image contrast of the contact holes 121 in the image 330. For instance, when the image contrast of the contact holes 121 in the image 330 is not strong enough for identifying the position/center of each of the contact holes 121, at least one of properties of the image 310 and properties of the image 320 is adjusted to generate a modified image 330 for identification. In some embodiments, for example, the opacity of the image 310 is adjusted to 40% and the opacity of the image 310 is adjusted to 80%.

The values and configurations of the adjustments to the images 310 and 320 are given for illustrative purposes. Various implements are within the contemplated scope of the present disclosure. For example, in some embodiments, the opacity of the images 310-320 keep the same while the contrast of the image 320 enhances.

In some embodiments, after the images 310 and 320 are modified, the generating the image 330 includes operations of merging the image 310 with the image 320 or adding the image 310 to the image 320. In various embodiments, the generating the image 330 includes operations of subtracting the image 310 from the image 320 or subtracting the image 320 from the image 310. In yet another embodiments, the generating the image 330 further includes the operations of subtracting the image 310 from the image 320, subtracting the image 320 from the image 310, adding the image 310 to the image 320, or the combinations thereof.

In addition, as the image 330 shown in FIG. 3, the contact holes 121 have greater contrast, uniform shapes and colors compared with those shown in the image 320.

In some approaches, because of physical limitations of the scanning electron microscope, the structures in the layers below the surface layer appears blurred in SEM images. Therefore, measurements of properties of structures based on those SEM images suffer from high fail rate. With the configurations of the present disclosure, details of lower layers are provided in mixed image, for example, the image 330, for further analysis. Accordingly, the fail rate of measurements decreases.

Figure 4A:
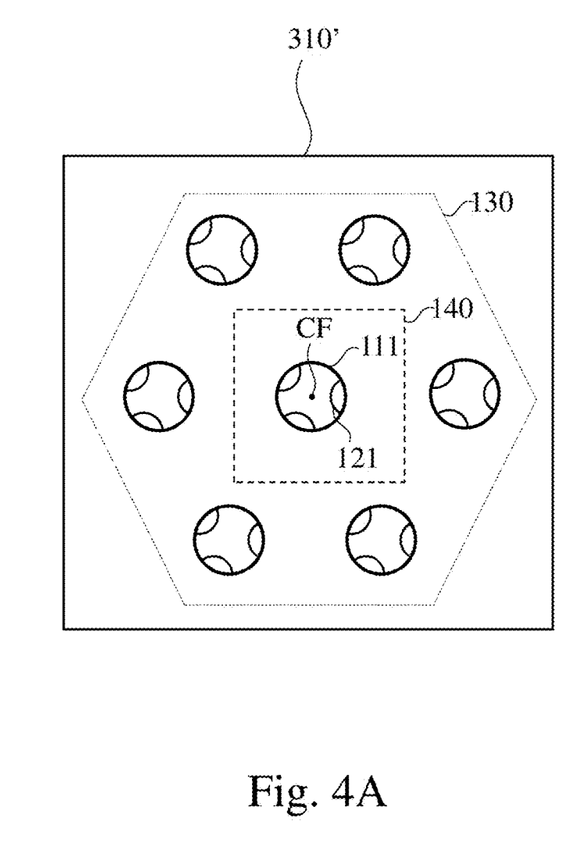
FIGS. 4A-4B are schematic diagrams of images corresponding to the layers in the semiconductor device of FIG. 1, in accordance with some embodiments of the present disclosure.
Figure 4B:
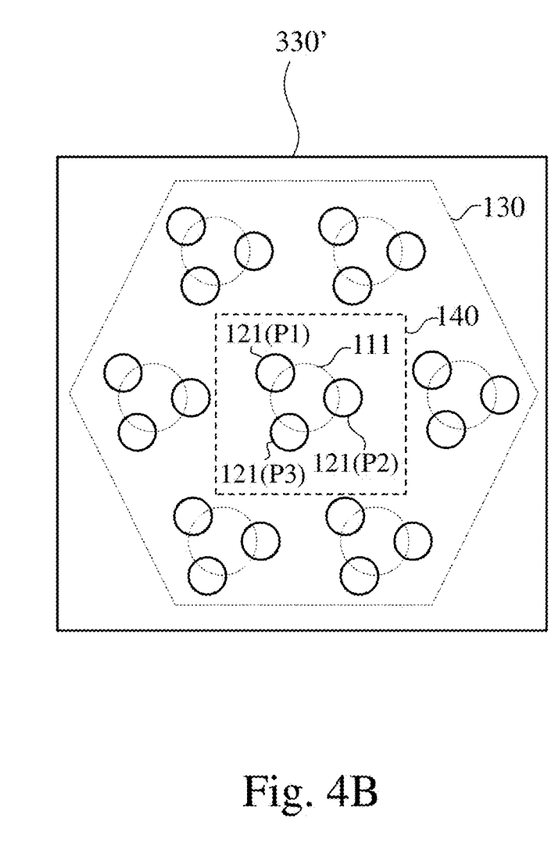

Reference is now made to FIGS. 4A-4B. FIGS. 4A-4B are schematic diagrams of images 310' and 330' corresponding to the layers 110 and 120 within a region 130 in the semiconductor device 10 of FIG. 1, in accordance with some embodiments of the present disclosure. For illustration, the image 310' is a schematic diagram corresponding to the SEM image 310, and the image 330' is a schematic diagram corresponding to the SEM image 330.

In some embodiments, the method 20 further includes identifying the contact holes 111 in the image 310' and the contact holes 121 in the image 320'. For example, the method 20 identifies in a region 140 one contact hole 111 overlapping a group of three contact holes 121, and further in operation 250 identifies a position of the contact hole 111 in the region 140. In some embodiments, as the contact hole 111 is a circle, a center CF of the contact hole 111 is identified as the position of the contact hole 111, as shown in FIG. 4A. In some embodiments, elements within the region 140 are referred as a unit structure of the semiconductor device 10.

For the sake of simplicity, only one unit structure is circled in the region 140 for illustration. Other contact holes 111 and contact holes 121 have similar configurations as those in the region 140 and are measured by the method 20. Hence, the repetitious descriptions are omitted here.

Figure 5:
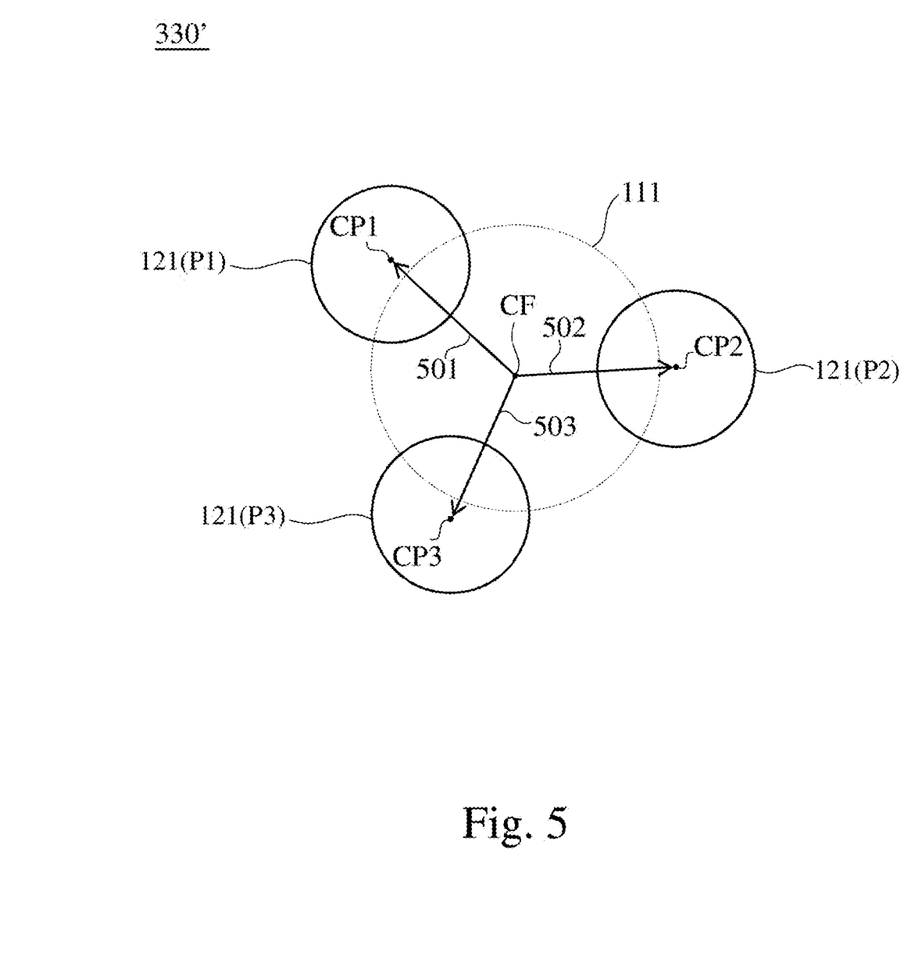
FIG. 5 is schematic diagram of an image corresponding to the layer in the semiconductor device of FIG. 1, in accordance with some embodiments of the present disclosure.

As mentioned above, similarly, in operation 260 identifies a position of each of the contact holes 121 in the region 140, as shown in FIGS. 4B and 5. Reference is now made to FIG. 5. FIG. 5 is schematic diagram of the image 330' corresponding to the layer 120 in the semiconductor device 10 of FIG. 1, in accordance with some embodiments of the present disclosure. In some embodiments, as the contact holes 121 are circles, centers of the contact holes 121 are identified as the position of the contact holes 121. For example, in FIG. 5, a center CP1 is identified as the position of the contact hole 121 at a first position P1 with respect to the center CF of the contact hole 111 which overlaps the three contact holes 121 in the region 140. A center CP2 is identified as the position of the contact hole 121 at a second position P2 with respect to the center CF of the contact hole 111. A center CP3 is identified as the position of the contact hole 121 at a third position P3 with respect to the center CF of the contact hole 111.

In some embodiments, the operation of identifying the contact holes 121 in the method 20 further includes identifying sequentially a first hole, a second hole, and a third hole that are in the corresponding group of holes in the contact holes 121. For illustration, there are seven unit structures (each one including one contact hole 111 and three corresponding contact holes 121, and circled in the region 140) in the image 330'. Centers of all contact holes 121 at the first position P1 in each unit structure are identified at the same time. Similarly, centers of all contact holes 121 at the second position P2 in each unit structure are identified at the same time, and centers of all contact holes 121 at the third position P3 in each unit structure are identified at the same time.

With continued reference to FIG. 2, in operation 270, offsets between the contact holes 111 and the contact holes 121 are calculated. In some embodiments, the operation 270 includes operations 271 and 272. In operation 271, a sub-offset between each of the contact holes 111 and corresponding contact holes 121 is calculated. For example, as shown in FIG. 5, a distance 501 is referred to as the sub-offset between the center CF of the contact hole 111 and the center CP1 of the contact hole 121 at the position P1, a distance 502 is referred to as the sub-offset between the center CF of the contact hole 111 and the center CP2 of the contact hole 121 at the position P2, and a distance 503 is referred to as the sub-offset between the center CF of the contact hole 111 and the center CP3 of the contact hole 121 at the position P3. Accordingly, the sub-offset for the one contact hole 111 of multiple contact holes 111 in the semiconductor device 10 is obtained based on the distances 501-503.

In some embodiments, the distances 501-503 are in the form of the value. For example, the distances 501-503 are about 90, 92, 91 nanometers. Subsequently, in operation 272 of calculating the offset based on the sub-offsets, the offsets between the contact holes 111 and the contact holes 121 are calculated based on the distances 501-503 referred to as the sub-offsets. As the embodiments mentioned above, the offset is an average of the distances 501-503 and about 91 nanometers.

In various embodiments, the distances 501-503 are in the form of the displacement vector, namely the distance 501 referred to as the vector $\overrightarrow{CFP1}$, the distance 502 referred to as the vector $\overrightarrow{CFP2}$, and the distance 503 referred to as the vector $\overrightarrow{CFP3}$. Accordingly, in operation 272 of calculating the offset based on the sub-offsets, the offset (vector $\overrightarrow{OO'}$) corresponding to the unit structure shown in FIG. 5 is a sum of the displacement vectors, as shown in the equation (1).

$$\overrightarrow{OO'} = \overrightarrow{CFP1} + \overrightarrow{CFP2} + \overrightarrow{CFP3} \qquad (1)$$

In operation 280, a net offset corresponding to the semiconductor device 10 is calculated. Specifically, after the operation 270, the offset corresponding to each unit structure (elements included in the region 140) in FIG. 4B are calculated. Accordingly, a net offset corresponding to all unit structures in the region 130 is obtained by, for example, calculating an average of the offsets, calculating a sum of the offsets, or any other suitable calculation. One who is skilled in the art can choose a calculation method based on the actual practice of the present disclosure.

In operation 290, at least one element in the semiconductor device 10 is manufactured in response to the net offset. For example, when the net offset exceeds a threshold value, some properties of a manufacturing tool (as shown in FIG. 6) is modified to manufacture the semiconductor device 10 until the net offset is below the threshold value.

Figure 6:
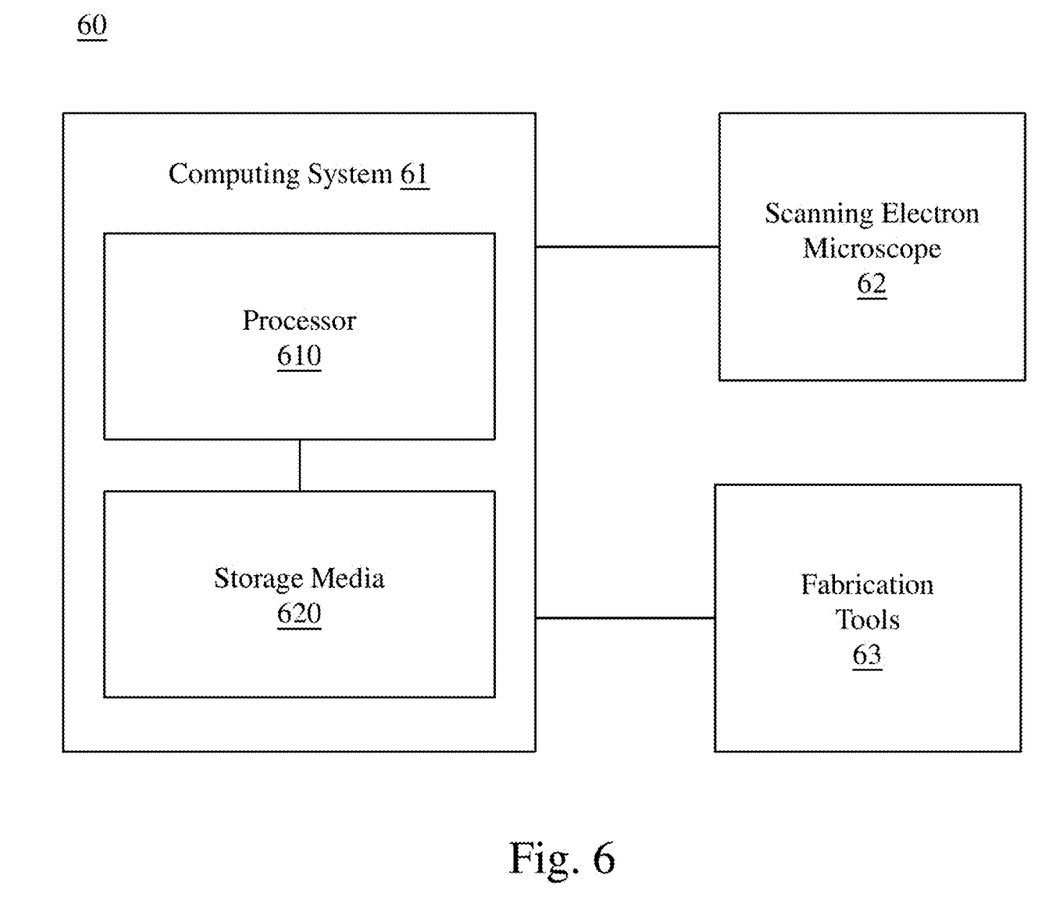
FIG. 6 is a schematic diagram of a manufacturing system, in accordance with some embodiments of the present disclosure.

Reference is now made to FIG. 6. FIG. 6 is a schematic diagram of a manufacturing system 60, in accordance with some embodiments of the present disclosure. For illustration, the manufacturing system 60 includes a computing system 61, a scanning electron microscope (SEM) 62, and fabrication tools 63. The computing system 61 is connected to the scanning electron microscope 62 and the fabrication tools 63 for transmitting measure data and instructions of manufacture process.

In some embodiments, the computing system 61 includes a processor 610 and a storage media 620. The processor 610 is electrically coupled to storage media 620 via a bus (not shown). The processor 610 is configured to execute computer program code encoded in the storage media 620 in order to cause the computing system 61 to be usable for performing a portion or all of the noted processes and/or methods, for example, the method 20. In one or more embodiments, processor 610 is a central processing unit (CPU), a multi-processor, a distributed processing system, an application specific integrated circuit (ASIC), and/or a suitable processing unit.

In some embodiments, the storage media 620 is an electronic, magnetic, optical, electromagnetic, infrared, and/or a semiconductor system (or apparatus or device). For example, the storage media 620 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the storage media 620 includes a compact disk-read only memory (CD-ROM), a compact disk-read/write (CD-R/W), and/or a digital video disc (DVD).

In one or more embodiments, the storage media 620 stores computer program code configured to cause the computing system 61 to be usable for performing a portion or all of the noted processes and/or methods. In one or more embodiments, the storage media 620 also stores information which facilitates performing a portion or all of the noted processes and/or methods. In some embodiments, the storage media

620 stores SEM images, of the semiconductor device 10, as disclosed herein, for example, images including the images 310, 320, and 330 discussed above with respect to FIGS. 1-5. In some embodiments, the storage media 620 stores data, of the semiconductor device 10, as disclosed herein, for example, data including the values of the centers of the contact holes 111 and the contact holes 121, the distances 501-503, sub-offsets, offsets, and the net offset corresponding to the contact holes 111 and the contact holes 121 discussed above with respect to FIGS. 1-5.

The scanning electron microscope 62 is configured to emit a primary electron beam focused to a fine spot on the semiconductor device 10 and scan the surface of the semiconductor device 10 to be observed. In some embodiments, secondary electrons are emitted from the surface as it is impacted by the primary beam and some electrons from the primary beam are backscattered. The secondary or backscattered electrons are detected and an image is formed, with the brightness at each point of the image being determined by the number of electrons detected when the beam impacts a corresponding spot on the surface. In some embodiments, the scanning electron microscope 62 is configured to obtain the (SEM) images 310, 320, and 330 for the method 20 of measuring the semiconductor device 10.

The fabrication tool 63 is configured to fabricate semiconductor devices, e.g., the semiconductor device 10 illustrated in FIGS. 1-5, according to the design files processed by the processor 610. In some embodiments, the fabrication tools 63 perform various semiconductor processes including, for example, generating photomasks based on layouts, fabricating using the photomasks, etching, deposition, implantation, and annealing. The fabrication tools 63 include, for example, photolithography steppers, etch tools, deposition tools, polishing tools, rapid thermal anneal tools, ion implantation tools, and the like. Each fabrication tool 63 modifies the wafer according to a particular operating recipe. For illustration, one fabrication tool 63 is configured to deposit a film having a certain thickness on a wafer, and another fabrication tool 63 is configured to etch away a layer from a wafer. Furthermore, in some embodiments, the fabrication tools 63 of the same type are designed to perform the same type of process.

Through the operations of the various embodiments above, the method provided by the present disclosure provides high accuracy of measuring semiconductor devices by utilizing SEM image adjustment and calculation method.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A method of measuring a semiconductor device, comprising:
   obtaining a first image corresponding to a first layer in the semiconductor device;
   obtaining a second image corresponding to a second layer, below the first layer, in the semiconductor device, wherein the first layer includes at least one first structure and the second layer includes a plurality of second structures that are overlapped by the at least one first structure;
   generating a third image by combining the first image and the second image;
   calculating an offset according to sub-offsets between a center of the at least one first structure and a center of each one in the plurality of second structures based on the first image and the third image, wherein the center of the at least one first structure is within the at least one first structure, and the center of each one in the plurality of second structures is within a corresponding one in the plurality of second structures; and
   manufacturing at least one element in the semiconductor device in response to the offset.

2. The method of claim 1, further comprising:
   adjusting properties of the first image and properties of the second image according to an image contrast of the plurality of second structures in the third image;
   wherein the generating the third image comprises:
      merging the first image with the second image.

3. The method of claim 2, wherein the adjusting the properties of the first image and the properties of the second image comprises:
   adjusting an opacity of the first image and an opacity of the second image.

4. The method of claim 1, wherein the generating the third image comprises:
   subtracting the first image from the second image or subtracting the second image from the first image.

5. The method of claim 1, further comprising:
   identifying the center of the at least one first structure in the first image; and
   identifying the center of each of the plurality of second structures in the third image.

6. The method of claim 5, wherein the calculating the offset based on the sub-offsets comprises:
   calculating an average of the sub-offsets as the offset.

7. The method of claim 1, further comprising:
   identifying a position of the at least one first structure in the first image;
   identifying a position of each of the plurality of second structures in the third image;
   calculating a displacement vector between the position of the at least one first structure and the position of each of the plurality of second structures; and
   calculating a sum of the displacement vectors as the offset.

8. The method of claim 1, wherein the first image and the second image are high voltage scanning electron microscope images.

9. The method of claim 1, wherein the at least one first structure includes a plurality of first holes, and the plurality of second structures includes a plurality of second holes that occupy a smaller area than the plurality of first holes;
   wherein one of the plurality of first holes overlaps at least one of the plurality of second holes.

10. A method of measuring a semiconductor device, comprising:
    adjusting a first image of a plurality of first holes in a first layer of the semiconductor device and adjusting a second image of a plurality of second holes in a second layer, different from the first layer, of the semiconductor device;
    generating, based on the first image of the plurality of first holes and the second image of the plurality of second holes, a third image according to identifying the plurality of second holes in the third image;
    calculating a first offset between a center of a first hole of the plurality of first holes and centers of a first group of the plurality of second holes, wherein the first hole of the plurality of first holes overlap the first group of the plurality of second holes; and manufacturing at least one element in the semiconductor device in response to the first offset.

11. The method of claim 10, wherein the adjusting the first image of the plurality of first holes and the adjusting the second image of the plurality of second holes comprise:

adjusting an opacity of the first image of the plurality of first holes and an opacity of the second image of the plurality of second holes;

wherein the generating the third image comprises:

subtracting the first image from the second image, subtracting the second image from the first image, adding the first image to the second image, or the combinations thereof.

12. The method of claim 10, further comprising:

identifying a center of each of the plurality of first holes in the first image; and identifying a center of each of the plurality of second holes in the third image;

wherein the calculating the first offset between the first hole of the plurality of first holes and the first group of the plurality of second holes comprises:

calculating a sub-offset between the center of the first hole of the plurality of first holes and the center of each one in the first group of the plurality of second holes.

13. The method of claim 12, wherein the calculating the first offset between the first hole of the plurality of first holes and the first group of the plurality of second holes further comprises:

calculating an average of the sub-offsets as the first offset.

14. The method of claim 10, further comprising:

calculating a second offset between a second hole, separated from the first hole, of the plurality of first holes and a second group, separated from the first group, of the plurality of second holes, wherein the second hole of the plurality of first holes overlap the second group of the plurality of second holes; and calculating a net offset based on the first offset and the second offset.

15. A method of measuring a semiconductor device, comprising:

generating a mixed image based on a first scanning electron microscope (SEM) image corresponding to a first layer in the semiconductor device and a second SEM image corresponding to a second layer, different from the first layer, in the semiconductor device;

identifying a plurality of first holes in the first SEM image and identifying a plurality of second holes in the mixed image, wherein each of the plurality of first holes overlaps a corresponding group of holes in the plurality of second holes;

calculating sub-offsets between a center of each one of the plurality of first holes and a center of each one in the corresponding group of holes in the plurality of second holes, wherein the center of a corresponding one in the plurality of first holes is within the corresponding one in the plurality of first holes, and the center of a corresponding one in the plurality of second holes is within the corresponding one in the plurality of second holes;

calculating an offset between the plurality of first holes and the plurality of second holes based on the sub-offsets; and manufacturing at least one element in the semiconductor device in response to the offset.

16. The method of claim 15, wherein the first layer is arranged above the second layer.

17. The method of claim 15, further comprising:

adjusting properties of the first SEM image and properties of the second SEM image according to an image contrast of the plurality of first holes and an image contrast of the plurality of second holes in the mixed image.

18. The method of claim 15, wherein the generating the mixed image comprises:

subtracting the first SEM image from the second SEM image, subtracting the second SEM image from the first SEM image, adding the first SEM image to the second SEM image, or the combinations thereof.

19. The method of claim 15, wherein the calculating the sub-offsets comprises:

calculating a displacement vector between the center of one of the plurality of first holes and the center of each one in the corresponding group of holes in the plurality of second holes; and calculating a sum of the displacement vectors as the sub-offset of the one of the plurality of first holes and the corresponding group of holes in the plurality of second holes.

20. The method of claim 15, wherein the identifying the plurality of second holes comprises:

identifying sequentially a first hole, a second hole, and a third hole that are in the corresponding group of holes in the plurality of second holes, wherein the first hole, the second hole, and the third hole are located at, separately, a first position, a second position, and a third position with respect to one of the plurality of first holes.

* * * * *